United States Patent Office 2,789,950
Patented Apr. 23, 1957

2,789,950

LUBRICATING COMPOSITION

Ralph I. Gottshall, Willow Grove, Pa., John G. Peters, Audubon, N. J., and Howard W. Swain, Drexel Hill, Pa., assignors to Gulf Oil Corporation, Pittsburgh, Pa., a corporation of Pennsylvania No Drawing. Application August 19, 1954,
Serial No. 451,040

4 Claims. (Cl. 252—32.5)

This invention relates to a lubricating composition and more particularly to a lubricant adapted for the lubrication of industrial machinery wherein the lubricant, by the nature of its use, becomes contaminated with foreign matter.

The continuous application of a lubricant to the bearings of certain industrial machinery gives rise to many problems as a result of the lubricating oil becoming contaminated with foreign matter. Ordinarily, the inorganic foreign matter can be readily separated from the lubricating oil by filtration or centrifuging. However, certain contaminants including acidic oil oxidation products and small amounts of water are carried along with the oil, giving rise to corrosion and rusting of metal parts with which the contaminated oil is contacted.

Corrosion and rusting of metal parts resulting from the lubricating oil becoming contaminated with foreign matter is frequently encountered in lubricating the bearings of drying rolls used in the drying of various manufactured products, particularly in the manufacture of paper. However, a similar problem is encountered in the lubrication of steam turbines.

In lubricating the bearings of steam-heated drying rolls used in drying paper, it is the practice to apply a continuous stream of lubricant to the bearing surfaces. The lubricant thus becomes contaminated by a portion of the water evaporated from the wet paper mix on the heated rollers and/or by leakage of process steam used for heating the rollers. The wet oil is then circulated from the region in which lubrication is effected to a settling tank where the bulk of the entrained water is settled out. The settled oil is then filtered through a plurality of cloth bag filters which are stretched over hollow metal frames. The filtered oil is removed from the space within the metal frames and is recirculated to the lubricating zone. The contamination of the oil with water and its exposure to oxidizing conditions subject the lubricating oil to severe deteriorating influences and result in the accumulation of corrosive acidic oxidation products.

Similar problems are encountered in lubricating the bearings of steam turbines. In the lubrication of the bearings of steam turbines, the lubricating oil is usually flowed over the bearing surfaces by forced circulation, the oil acting both as a coolant and a lubricant. The oil under such use is subjected to relative high temperatures and becomes contaminated by steam condensate from the steam used to operate the turbine. The oil circulation system generally includes a cooling means, a large capacity settling tank for separating the bulk of the water and inorganic impurities from the oil, and, in addition a centrifuging and/or a filtering device to remove oil oxidation products which become insoluble in the oil. In a system of this type, the lubricating oil is subjected to severe operating conditions. The oil undergoes continuous temperature changes from the bearings to the cooler, it becomes contaminated with water, and in its rapid circulation it is exposed to conditions favoring oxidation. These conditions tend to build up in the oil relatively large amounts of acidic oil oxidation products which are corrosive to metal turbine parts. Because of the difficulty in removing all of the water with which the oil has been contaminated, the metal turbine parts frequently are rusted.

The accumulation of acidic oil oxidation products in large capacity lubricating systems which become contaminated with water has the further disadvantage of resulting in the formation of emulsions which are difficult to break. When stable emulsions are formed, the oil tends to lose its lubricating qualities and must be replaced by new oil. In large capacity systems, such as those used in connection with the lubrication of drying rolls and steam turbines, replacement of the oil represents a major item of cost.

The present invention is based upon a particularly effective lubricating composition having good resistance to oxidation combined with good lubricating characteristics and corrosion and rust-inhibiting properties. The composition of the present invention, because of its resistance to oxidation, also has improved stability with respect to its emulsifying characteristic.

The improved lubricating composition of this invention consists essentially of a homogeneous mixture of lubricating oil, an alkyl phenol, a substantially neutral addition product of isoamyl octyl acid phosphate with primary fatty amines containing from 8 to 18 carbon atoms, and an acid ester of (1) a dimeric acid derived from an unsaturated fatty acid containing from 6 to 22 carbon atoms and having from 2 to 3 ethylenic linkages per molecule and (2) a partial ester of a fatty acid containing from 12 to 24 carbon atoms and an alkitol anhydride. An improved lubricating composition can be prepared by incorporating in an oil an alkyl phenol and a substantially neutral addition product of isoamyl octyl acid phosphate with primary fatty amines containing from 8 to 18 carbon atoms. While the composition thus obtained has good oxidation stability and good rust-inhibiting properties so long as the bulk of the oil is present, the composition does not possess good film forming properties such as those required to protect metal surfaces from rusting when the bulk of the oil is not present.

We have found that an oil to which has been added an alkyl phenol and a substantially neutral addition product of isoamyl octyl acid phosphate with primary fatty amines containing from 8 to 18 carbon atoms can be improved with respect to its film-forming properties by incorporating in the composition a small amount of an acid ester of (1) a dimeric acid derived from an unsaturated fatty acid containing from 6 to 22 carbon atoms and having from 2 to 3 ethylenic linkages per molecule and (2) a partial ester of a fatty acid containing from 12 to 24 carbon atoms and an alkitol anhydride.

The lubricating oil to which the other constituents are added is advantageously a highly refined paraffinic oil. By the term "highly refined paraffinic oil" we mean a petroleum lubricating oil which has been refined by one of the more drastic refining methods known in the art, for example, by conventional aluminum chloride refining or by a solvent extraction adapted to remove all or substantially all of the unsaturated and naphthenic constituents of the oil. Aluminum chloride refined or solvent extracted paraffinic base oil, such as a Pennsylvania oil, provides an excellent base oil for the composition of the invention. However, drastically refined Mid-Continent and Gulf Coastal oil may also be used.

The alkyl phenol which is used in accordance with the invention is advantageously a di- or tri-alkylated phenol or cresol with at least one of the alkyl groups being a tertiary alkyl group. The alkyl groups are preferably those containing between 3 and 12 carbon atoms. Good results can be obtained with a tri-tertiary butyl phenol or a di-tertiary butyl cresol. Examples of the preferred alkylated phenols are 2,4,6-tri-tertiary-butylphenol, 2,6-di-tertiary-butyl-4-methylphenol and bis(2-hydroxy-3-tertiary-butyl-5-methylphenyl)methane. The alkyl phenols can be used in amounts of about 0.1 to about 5.0 percent by weight based on the weight of the total composition. The preferred amount, however, is between about 0.2 and about 1.25 percent by weight.

The fatty amine salt of isoamyl octyl acid phosphate which can be used in accordance with the invention is prepared by reacting isoamyl octyl acid phosphate with a primary fatty amine containing from 8 to 18 carbon atoms. One example of a primary fatty amine suitable for the purpose of this invention is cocoamine, which is a commercially available product prepared by converting coconut oil fatty acids into the corresponding amine. It consists mostly of mono-lauryl amine with minor amounts of adjacent homologues. The cocoamine salt of isoamyl octyl acid phosphate and its preparation are fully described in U. S. Patent No. 2,371,851 which issued on March 20, 1945, to Herschel G. Smith and Troy L. Cantrell. As disclosed in said patent, the cocoamine salt of isoamyl octyl acid phosphate can be readily prepared by reacting cocoamine with isoamyl octyl acid phosphate in approximately equimolecular ratios, the reaction being so controlled as to produce substantially neutral reaction mixtures having a pH value within the range 5.5 to 7.5, as illustrated in Examples 1 and 2 of that patent. The isoamyl octyl acid phosphate employed is a di-ester of orthophosphoric acid having the following formula:

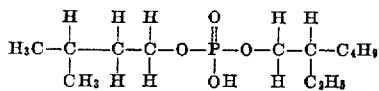

This compound is also known as 3-methylbutyl,2-ethyl hexyl acid orthophosphate. It readily reacts with cocoamine and other primary fatty amines containing from 8 to 18 carbon atoms. Instead of cocoamine we can use other primary fatty amines containing from 8 to 18 carbon atoms. These amines include mono-capryl, $CH_3(CH_2)_8CH_2NH_2$, mono-lauryl, mono-myristyl, mono-palmityl and mono-stearyl amines. The fatty acid amine salt of isoamyl octyl acid phosphate is preferably used in an amount between about 0.01 and about 0.2 percent by weight based on the weight of the total composition. However, improved results can be obtained with an amount between about 0.001 and about 1.0 percent by weight.

The acid esters employed in accordance with this invention are the reaction products resulting from the esterification of a dimerized unsaturated fatty acid with a partial fatty acid ester of an alkitol anhydride. The ratio of reactants may range from one mol of dimerized acid per mol of partial fatty acid ester up to the number of mols of dimerized acid that is equal to the number of free hydroxyl groups in the partial fatty acid ester, per mol of partial fatty acid ester.

The esterification reaction is effected in conventional manner and under conventional conditions. Thus, while esterification may proceed slowly at room temperature, the reaction is normally advantageously accelerated by heating the reactants, usually with refluxing, and/or by the use of conventional esterification catalysts, such as hydrogen chloride, sulfuric acid, or an aromatic sulfonic acid, such as p-toluene-sulfonic acid. The reaction may be driven to substantial completion by removing one of the products of reaction. Since the herein disclosed dimeric unsaturated fatty acids, partial esters of alkitol anhydrides, and their reaction products boil at a temperature substantially above the boiling point of water, the reaction conveniently may be driven to completion by removal of the water of esterification by distillation. The removal of water from the reaction mixture may be facilitated by mechanical agitation, or by bubbling an inert gas, such as nitrogen, through the reaction mixture.

By way of illustrating the foregoing process, one, two or three mols of dimerized acid may be esterified with one mol of a partial fatty acid ester containing three free hydroxyl groups, under conventional reaction conditions, with the elimination, respectively, of one, two or three mols of water of esterification, to form, respectively, a mono-, or tri-acid or tricarboxylic ester of the dimerized acid and the partial fatty acid ester.

If desired, the reaction products may be prepared by effecting esterification of the reactants in mineral oil solution. This expedient is advantageous in that it prevents localized overheating of the reactants. Moreover, the resulting reaction products are in the form of mineral oil concentrates, the use of which often facilitates solution of the additives in their ultimate vehicles.

The dimerized acids referred to above are dimers, i. e., bimolecular addition products of conjugated or unconjugated dienonic or trienoic fatty acids having from 6 to 22 carbon atoms before dimerization. Dimeric acids derived from dienoic and trienoic fatty acids are well known and can be prepared by conventional methods which form no part of this invention.

More particularly, dimerized acids capable of forming the compounds utilized in the composition of this invention are prepared from dienoic or trienoic fatty acids having the generic formula $C_nH_{2n-x}COOH$, where $n$ is an integer of from 5 to 21 and $x$ is 3 or 5. As will be evident, such monomeric acids contain from 6 to 22 carbon atoms and may contain 2 or 3 ethylenic linkages as the ratio of carbon to hydrogen increases, i. e., as $x$ increases from 3 to 5. Dimerized acids corresponding to the addition products of the foregoing acids therefore may be defined by the generic formula:

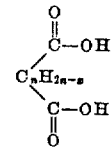

where $n$ is an integer of from 10 to 42 and where $x$ is an even integer of from 6 to 10. These dimeric acids are therefore dibasic or dicarboxylic acids having from 12 to 44 carbon atoms.

Representative members of the class of dimerized acids capable of forming the compounds employed in the compositions of this invention are dimers of dienoic acids such as sorbic (hexadienoic), linoleic (octadecadienoic), humoceric (nonadecadienoic) and eicosinic (eicosadienoic) acids. Dimers of trienoic acids, for example, linolenic and eleostearic (octadecatrienoic) acids also may be used.

It is not necessary that both of the unsaturated fatty acid molecules of the bimolecular addition product be identical. Dimers of mixed composition such as those obtained by dimerizing mixed dienoic, mixed trienoic or mixed dienoic and trienoic acids such as may be derived from certain naturally occurring drying oils, e. g., linseed oil and soybean oil, are quite satisfactory.

Dienoic and trienoic acids having 18 carbon atoms, especially those having conjugated olefinic linkages, are preferred for reasons of economy of procurement, ease of reaction and the general excellence of the additives prepared therefrom.

The partial esters of alkitol anhydrides and fatty acids adapted for use in the formation of the reaction products are those resulting from esterification with the desired fatty acid of at least one, but less than all, of the available hydroxyl groups of an alkitol anhydride. By alkitol anhydride is meant an intramolecular, mono- or di-anhydride of a polyhydric alcohol which contains at least 4 carbon atoms and at least 4 hydroxyl groups, or mixtures of said anhydrides. Representative of the class of alkitols are erythritol; pentitols, such as arabitol, xylitol and adonitol; and hexitols such as mannitol, dulcitol and sorbitol, just as the xylitans and sorbitans are representative of the alkitol anhydrides, or alkitans.

Fatty acids capable of forming partial esters of alkitol anhydrides suited to the preparation of the additives utilized in this invention are the fatty acids containing from 12 to 24 carbon atoms. These acids may be saturated or unsaturated, and they may be substituted with groups which do not adversely affect the oil-solubility or corrosion-inhibiting properties of the final reaction product. Representative of this group of acids are lauric acid, oleic acid, ricinoleic acid, stearic acid and lignostearic acid.

Partial esters capable of reacting to form the reaction products include those formed by reacting a fatty acid of the foregoing kind with the desired alkitol anhydride in a molar ratio of at least 1:1, but less than that which would result in neutralization of all of the hydroxyl groups of the alkitol anhydride. The use of mixtures of partial fatty acid esters of alkitol anhydride is also included within the scope of the invention. Specific examples of partial esters of alkitol anhydrides capable of reacting with dimeric unsaturated fatty acids to form acid esters which can be used in the composition of the invention are xylitan and sorbitan mono-, sesqui-, di- and tri-oleates and stearates. Partial esters of hexitol anhydrides, i. e., anhydrides of polyhydric alcohols containing 6 carbon atoms and 6 hydroxyl groups, are preferred.

The partial esters of alkitol anhydrides disclosed herein as well as the method of preparing the same are conventional and form no part of the present invention. Accordingly, they need not be described in detail.

Representative specific examples of acid esters of dimeric acids with partial fatty acid esters of alkitans which can be used in the compositions of this invention are the mono- and poly-carboxylic acid esters of dimerized linoleic, linolenic and eleostearic acids with sorbitan and xylitan mono-, sesqui-, di- and tri-oleates and stearates. Included within the foregoing representative class of compounds are mono-, di-, and tri-acid dilinoleic mono-, di- and tri-esters of sorbitan monooleate, mono- and di-acid dilinoleic mono- and di-esters of sorbitan dioleate, mono-acid dilinoleic mono-esters of sorbitan trioleate, mono- and di-acid dilinoleic mono- and di-esters of xylitan monooleate, mono-acid dilinoleic mono-esters of xylitan dioleate, and corresponding acid esters made from dimerized linolenic and eleostearic acids, as well as those made from partial esters of stearic acid.

The preparation of the class of compounds useful in the compositions of the invention can be further illustrated by the following specific example:

EXAMPLE I

An acid ester of a dimeric unsaturated fatty acid and a partial fatty acid ester of an alkitol anhydride was prepared by admixture and reaction of 428 parts by weight of sorbitan monooleate (manufactured by the Atlas Powder Company of Wilmington, Delaware, and marketed under the name "Span 80") with 560 parts by weight of dimerized linoleic acid (manufactured by Emery Industries, Inc. of Cincinnati, Ohio, and marketed under the name of Emery 955 Dimer Acid). The reaction mixture was heated under reflux, until 18 parts by weight of water had been trapped off, the maximum temperature reached by the reaction mixture being 500° F. The dimerized linoleic acid of this example had the following characteristics:

| | |
|---|---|
| Physical state | Straw-colored viscous liquid. |
| Molecular weight | 564 (approx.). |
| Gravity, ° API | 13.0. |
| Viscosity, SUV, 200° F | 597. |
| Flash, OC, ° F | 510. |
| Fire, OC, ° F | 575. |
| Color, NPA | +10. |
| Iodine No., Mod. Hanus | 83.3. |
| Saponification No | 186. |
| Neutralization No | 182. |
| Dimer content | 85% (approx.). |
| Trimer and higher | 12% (approx.). |
| Monomer | 3% (approx.). |

The properties of the sorbitan monooleate were as follows:

| | |
|---|---|
| Molecular weight | 428 (approx.). |
| Gravity, ° API | 10.1. |
| Sp. gr., 60°/60° F | 0.999. |
| Lb./gal., 60° F | 8.32. |
| Viscosity, SUV: | |
| 100° F | 1827. |
| 210° F | 108.3. |
| Flash, P–M, ° F | 400. |
| Flash, OC, ° F | 410. |
| Fire, OC, ° F | 450. |
| Pour, ° F | +10. |
| Physical state, room temp | Viscous liquid. |
| Color, ASTM union | 4.5. |
| Water by dist'n, percent | Nil. |
| Carbon residue, Conradson, percent | 2.94. |
| Neutralization value, ASTM D974–51T, total acid No | 6.15. |
| pH value, glass-calomel electrodes | 7.0. |
| Saponification No., ASTM D94–48T | 149.0. |
| Acetyl value, Gulf 433 | 142. |
| Ash, percent | 0.212. |

The product obtained in the above-described reaction was a clear, viscous liquid containing predominantly mono-acid esters of dimerized linoleic acid and sorbitan monooleate, having the following physical properties:

| | |
|---|---|
| Gravity, ° API | 13.4. |
| Sp. gr., 60°/60° F | 0.977. |
| Lb./gal., 60° F | 8.13. |
| Viscosity, SUV, sec.: | |
| 100° F | 9936. |
| 210° F | 498. |
| Flash, P–M, ° F | 425. |
| Pour, ° F | 0. |
| Physical state, room temp | Viscous liquid. |
| Color, ASTM union | 6.0. |
| Neutralization value, ASTM D974–51T, total acid No | 70. |
| pH value, glass-calomel electrodes | 4.6. |

The acid esters of other dimerized unsaturated fatty acids and other partial fatty acid esters of alkitol anhydrides are similarly prepared.

The amount of the acid ester employed in the composition of the invention depends upon the characteristic of the base oil as well as upon the amounts of other additive agents present. Satisfactory results can be obtained when the amount of acid ester comprises about 0.001 to about 1.0 percent by weight based on the weight of the total composition. A preferred range, however, comprises about 0.01 to about 0.2 percent by weight. In any event, the acid ester is used in an amount sufficient to improve the film tenacity characteristic of the composition and to simultaneously overcome the deleterious effect obtained by increased proportions of the substantially neutral addition product of isoamyl octyl acid phosphate with primary fatty amines containing from 8 to 18 carbon atoms.

The lubricating oil compositions of this invention can contain other additive agents if desired to improve other specific properties without deleteriously affecting the beneficial properties of the compositions. For example, pour point depressors, viscosity and viscosity index improvers, dyes, sludge inhibitors and the like can be used. Also, if desired, the oil can contain a foam inhibitor such as organo-silicon oxide condensation products, organo-silicol condensation products and the like.

The individual constituents of the compositions of this invention may be added to the lubricating oil base in any order or simultaneously, either per se or in the form of a mineral oil concentrate. The latter practice is sometimes desirable in order to facilitate compounding of the compositions.

The advantages obtained by using the improved lubricating composition of the invention as compared with similar compositions containing less than all of the addition agents are illustrated by the following specific examples. In these examples, the improved resistance to oxidation has been demonstrated by subjecting the various samples of oil to the procedure of ASTM test D943–47T, entitled "Oxidation Characteristics of Inhibited Steam Turbine Oils." The conditions of this test are such as to approximate under aggravated circumstances the conditions to which a lubricating oil is subjected in circulating lubricating systems of large capacity wherein the lubricant is contaminated with water. Briefly, the test comprises subjecting 300 milliliters of the lubricating oil sample to a flowing stream of oxygen in the presence of 60 milliliters of water and an iron-copper catalyst and determining the time required for the acidic oil oxidation products to build up to a neutralization value (acid number) of 2.0. The flow of oxygen is maintained at 3 liters per hour. It has been recognized in the art that lubricating oils in which the amount of acidic organic oxidation products is greater than that represented by an acid number of 2.0 are no longer serviceable because of corrosivity, the formation of sludge and stable emulsions and the general deterioration of lubricating qualities.

It is to be noted that during the course of the test, the flowing stream of oxygen intimately mixes the oil and water layers, thus resembling the conditions encountered in lubricating steam turbines, paper mill rolls, etc. The iron and copper catalyst metals represent the metals normally found in industrial machinery and simulate the catalytic deteriorating influences of these metals on the oil in the presence of water and oxygen.

The rust-preventing characteristics of the composition of the invention have been demonstrated by subjecting the various samples of oil to the provisions of ASTM test D665–47T, Procedure A and Procedure B. Following this test, the oil samples were further subjected to the "Film Tenacity" test. In brief, Procedure A of ASTM D665–47T involves placing a 300 milliliter sample of the oil in a 400 milliliter beaker which is, in turn, immersed in a constant temperature bath maintained at a temperature of 140° F. The beaker is fitted with a cover provided with openings for a stainless steel, motor-driven stirrer and for insertion of a standard steel test bar having a diameter of 0.50 inch and a length of approximately 5.5 inches which has been carefully cleaned and polished according to a prescribed procedure just prior to the test. The stirrer is started and when the oil sample in the beaker reaches a temperature of 140° F., the test bar is lowered through the proper opening and is suspended from the beaker cover. After 30 minutes, 50 milliliters of the oil are removed and replaced with 30 milliliters of distilled water. Stirring is then continued for 24 hours with the temperature maintained at 140° F. At the end of this period the steel bar is removed and examined for rust spots. The Procedure B is identical to Procedure A except that the distilled water of Procedure A is replaced by synthetic sea water.

The film tenacity test is designed to evaluate corrosion resistance of the film of the oil composition as applied to steel surfaces. It is carried out immediately after the ASTM test D665–47T, Procedure A. If the steel test bar used in the ASTM test shows no evidence of rusting, it is suspended in the mouth of a 300 milliliter flask and is allowed to drain. The beaker containing the oil sample is removed from the constant temperature bath and is replaced with a clean beaker containing 300 milliliters of distilled water. With the stirrer operating, the temperature of the water in the beaker is allowed to reach 140° F. When the test bar has drained for a period of 30 minutes, it is inserted in the beaker as above. Stirring is continued for 24 hours, after which the test bar is removed and examined for rust spots.

It will be seen that this test is quite drastic, since throughout its operation the steel test bar is protected from the rust only by a thin residual film of the oil being tested. It not only evaluates the protection against rusting provided by the composition, but also indicates the tenacity with which a film of the composition adheres to the metal surface.

In conducting the foregoing tests, two base oils suitable for use in lubricating paper mill roller bearings and steam turbines were used. Base oil A consisted of 29 percent by volume of a filtered Mid-Continent special oil having an API gravity between about 27° and 29° and a viscosity of about 450 SUS at 100° F. and 71 percent by volume of a highly refined, aluminum chloride treated paraffinic oil having an API gravity between about 26.5° and 28.5° and a viscosity of about 1165 SUS at 100° F. Base oil B consisted of 56 percent by volume of a highly refined, aluminum chloride treated paraffinic oil having an API gravity between about 26.5° and 28.5° and a viscosity of about 1165 SUS at 100° F. and 44 percent by volume of a paraffinic Mid-Continent oil having an API gravity between about 27° and 29° and a viscosity of about 600 SUS at 100° F. The oil in such instance also contained 0.0003 percent by weight of Dow-Corning silicone Fluid 200 as a foam inhibitor.

The results of the foregoing tests are presented in Table I below:

*Table I*

| Composition, Percent by Wt | A | B | C | D | E | F | G | H |
|---|---|---|---|---|---|---|---|---|
| Base oil A | 100 | | 98.87 | 98.75 | 98.72 | 98.69 | | |
| Base oil B | | 100 | | | | | 98.87 | 98.72 |
| 2,6-di-tertiary-butyl-4-methylphenol | | | 1.0 | 1.0 | 1.0 | 1.0 | 1.0 | 1.0 |
| Cocoamine isoamyl octyl orthophosphate | | | 0.1 | 0.2 | 0.1 | 0.15 | 0.1 | 0.1 |
| Dimerized linoleic acid-sorbitan monooleate acid ester reaction product of Example I | | | | | 0.15 | 0.15 | | 0.15 |
| Inspection: | | | | | | | | |
| ASTM D 943–47 T, Hours to give 2.0 Acid No | <200 | <200 | 700 | 575 | 924 | 990 | 560 | 800 |
| ASTM D 665–47 T— | | | | | | | | |
| Procedure A, Percent Rust | 100 | 100 | 0 | 0 | 0 | 0 | 0 | 0 |
| Procedure B, Percent Rust | 100 | 100 | 0 | 0 | trace | 0 | 0 | 10 |
| Film Tenacity, Percent Rust | | | 80 | 50 | 0 | 0 | 70 | 0 |

As may be seen from the above table, the service life of the lubricating oil, as measured by the number of hours required to reach an acid number of 2.0 was significantly increased by the addition of 2,6-di-tertiary-butyl-4-methylphenol and cocoamine isoamyl octyl orthophosphate to the base oil (compositions C, D and G). It will be noted from the film tenacity data, however, that the oil compositions did not form protective films on the metal test specimens until a small amount of the dimerized linoleic acid-sorbitan monooleate acid ester reaction product was added. The addition of the latter product gave an additional surprising result in that it successfully overcame the deleterious effect on the oxidizing characteristic of the oil caused by adding a larger amount of cocoamine isoamyl octyl orthophosphate. Compositions specifically illustrating the compositions of the invention are compositions E, F and H.

While the invention has been described above with reference to certain specific embodiments thereof by way of illustration, it is to be understood that the invention is not limited to such embodiments except as hereinafter defined in the appended claims.

We claim:

1. An improved lubricating composition consisting essentially of a major proportion of a mineral lubricating oil and minor proportions consisting of about 0.1 to about 5.0 percent by weight of an alkyl phenol, said alkyl phenol containing at least one alkyl group containing between 3 and 12 carbon atoms, about 0.001 to about 1.0 percent by weight of a substantially neutral addition product of 3-methylbutyl,2-ethylhexyl acid orthophosphate and a primary fatty amine, said amine being a mono-alkyl amine containing from 8 to 18 carbon atoms, and an acid ester of (1) a dimeric acid derived from an unsaturated fatty acid containing from 6 to 22 carbon atoms and having from 2 to 3 ethylenic linkages per molecule and (2) a partial ester of a fatty acid containing from 12 to 24 carbon atoms and an alkitol anhydride, said acid ester containing at least one unreacted carboxyl group per molecule and wherein said acid ester is present in an amount sufficient to improve the film tenacity characteristic of the composition.

2. An improved lubricating composition consisting essentially of a major proportion of a mineral lubricating oil and minor proportions consisting of about 0.1 to about 5.0 percent by weight of an alkyl phenol, said alkyl phenol containing at least one alkyl group containing between 3 and 12 carbon atoms, about 0.001 to about 1.0 percent by weight of the cocoamine salt of 3-methylbutyl,-2-ethylhexyl acid orthophosphate, and an acid ester of (1) a dimeric acid derived from an unsaturated fatty acid containing 18 carbon atoms and having from 2 to 3 ethylenic linkages per molecule and (2) a partial ester of a fatty acid containing 18 carbon atoms and a hexitol anhydride, said acid ester containing at least one unreacted carboxyl group per molecule and wherein said acid ester is present in an amount sufficient to improve the film tenacity characteristic of the composition.

3. An improved lubricating composition consisting essentially of a major proportion of a mineral lubricating oil and minor proportions consisting of about 0.1 to about 5.0 percent by weight of a tertiary alkyl phenol, said tertiary alkyl phenol containing at least one alkyl group containing between 3 and 12 carbon atoms, about 0.001 to about 1.0 percent by weight of the cocoamine salt of 3-methylbutyl,2-ethylhexyl acid orthophosphate, and about 0.001 to about 1.0 percent by weight of an acid ester of a dimer of linoleic acid and sorbitan monooleate, said acid ester containing at least one unreacted carboxyl group per molecule.

4. An improved lubricating composition consisting essentially of a major proportion of a mineral lubricating oil and minor proportions consisting of about 0.1 to about 5.0 percent by weight of 2,6-di-tertiary-butyl-4-methylphenol, about 0.001 to about 1.0 percent by weight of the cocoamine salt of 3-methylbutyl,2-ethylhexyl acid orthophosphate, and about 0.001 to about 1.0 percent by weight of an acid ester of a dimer of linoleic acid and sorbitan monooleate, said acid ester containing at least one unreacted carboxyl group per molecule.

References Cited in the file of this patent
UNITED STATES PATENTS

| | | |
|---|---|---|
| 2,364,283 | McDermott | Dec. 5, 1944 |
| 2,371,655 | Smith et al. | Mar. 20, 1945 |

FOREIGN PATENTS

| | | |
|---|---|---|
| 428,864 | Great Britain | May 15, 1935 |

UNITED STATES PATENT OFFICE

CERTIFICATE OF CORRECTION

Patent No. 2,789,950                        April 23, 1957

Ralph I. Gottshall et al.

It is hereby certified that error appears in the printed specification of the above numbered patent requiring correction and that the said Letters Patent should read as corrected below.

Column 4, line 17, for "mono-, or tri-acid" read -- mono-, di- or tri-acid --; column 7, line 33, for "milliters" read -- milliliters --.

Signed and sealed this 3rd day of September 1957.

(SEAL)

Attest:
KARL H. AXLINE

Attesting Officer

ROBERT C. WATSON
Commissioner of Patents